(12) United States Patent
Grush et al.

(10) Patent No.: US 10,621,795 B2
(45) Date of Patent: Apr. 14, 2020

(54) METHOD OF AUTONOMOUS LANE IDENTIFICATION FOR A MULTILANE VEHICLE ROADWAY

(71) Applicant: Applied Telemetrics Holdings, Inc., Toronto (CA)

(72) Inventors: Bernard Grush, Toronto (CA); Roger D'Hollander, London (CA); Joseph LeBlanc, Toronto (CA)

(73) Assignee: APPLIED TELEMETRICS HOLDINGS INC., Toronto, Ontario (CA)

( * ) Notice: Subject to any disclaimer, the term of this patent is extended or adjusted under 35 U.S.C. 154(b) by 0 days.

(21) Appl. No.: 15/855,636

(22) Filed: Dec. 27, 2017

(65) Prior Publication Data

US 2018/0122154 A1    May 3, 2018

Related U.S. Application Data (63) Continuation-in-part of application No. 14/598,038, filed on Jan. 15, 2015, now abandoned.

(51) Int. Cl.
*G07B 15/06* (2011.01)
*G01C 21/34* (2006.01)
(Continued)

(52) U.S. Cl.
CPC ......... *G07B 15/06* (2013.01); *G01C 21/3407* (2013.01); *G01C 21/3453* (2013.01);
(Continued)

(58) Field of Classification Search
CPC ....................................................... G07B 15/06
See application file for complete search history.

(56) References Cited

U.S. PATENT DOCUMENTS

| | | |
|---|---|---|
| 7,215,255 B2 | 5/2007 | Grush |
| 2003/0189498 A1 | 10/2003 | Kakihara et al. |

(Continued)

*Primary Examiner* — Imran K Mustafa (57) ABSTRACT

A method is provided for identifying whether a vehicle has entered, departed, or stayed in a target lane as opposed to an adjacent non-target lane of a segmented roadway. Signals are received from at least one signal source at a receiver within, attached to or integrated into the vehicle marking the geographic position of the vehicle at a sampling rate in a detailed travel path. At each sampled point in the travel path, the method compares the standard perpendicular distance between:

the vehicle and the target lane centerline (d1); and
the vehicle and the non-target lane centerline (d2);

It is assessed that the vehicle is in the target lane if the distance d1 is less than the distance d2, and otherwise, it is assessed that the vehicle is in the non-target lane. From a time (t1) at which the vehicle is assessed to be departing from the target lane, each such sampled point is deemed to be an excursion point and the excursion point departure distances are summed until the vehicle is assessed to return to the target lane, or the detailed travel path ends, at a time (t2); and if:

the sum of the excursion point departure distances is less than a threshold distance, or
the time from t1 to t2 is less than a threshold time, the vehicle is treated as having remained in the target lane, and otherwise, the vehicle is treated as having changed to the non-target lane between time t1 and t2. A related system is also provided.

14 Claims, 4 Drawing Sheets

(51) Int. Cl.
  G08G 1/01    (2006.01)
  G01C 21/36   (2006.01)
  G06Q 40/00   (2012.01)
  G06Q 50/30   (2012.01)
  H04W 84/00   (2009.01)
  H04W 4/021   (2018.01)
  H04W 4/029   (2018.01)
  G06K 9/00    (2006.01)
  H04W 4/02    (2018.01)
  H04W 4/40    (2018.01)

(52) U.S. Cl.
  CPC ..... *G01C 21/3626* (2013.01); *G06K 9/00778* (2013.01); *G06Q 40/00* (2013.01); *G06Q 50/30* (2013.01); *G08G 1/012* (2013.01); *G08G 1/0112* (2013.01); *G08G 1/0129* (2013.01); *H04W 4/021* (2013.01); *H04W 4/029* (2018.02); *H04W 84/00* (2013.01); *G06K 9/00798* (2013.01); *H04W 4/027* (2013.01); *H04W 4/40* (2018.02)

(56) References Cited

U.S. PATENT DOCUMENTS

| | | | |
|---|---|---|---|
| 2007/0021912 A1* | 1/2007 | Morita | G01C 21/12 701/431 |
| 2008/0300776 A1* | 12/2008 | Petrisor | G08G 1/0112 701/118 |
| 2009/0157566 A1 | 6/2009 | Grush | |
| 2012/0173530 A1 | 7/2012 | Kurciska et al. | |
| 2012/0215594 A1* | 8/2012 | Gravelle | G07B 15/02 705/13 |
| 2014/0002652 A1* | 1/2014 | Gonzales | G07B 15/06 348/148 |
| 2014/0236686 A1 | 8/2014 | Grush et al. | |
| 2014/0310074 A1 | 10/2014 | Gravelle | |

* cited by examiner

Fig. 5b 5b minor departure (still in lane)

Fig. 5a

5a: lane departure

Fig. 6a

| date (j) | time(j) | Lat(j) | Lon(j) | e(j) | L(j) | decision(j) |
|---|---|---|---|---|---|---|
| date (j+1) | time(j+1) | Lat(j+1) | Lon(j+1) | -0.5 | 0 | in |
| date (j+2) | time(j+2) | Lat(j+2) | Lon(j+2) | -0.2 | 0 | in |
| date (...) | time(...) | Lat(...) | Lon(...) | 0 | 0 | in |
| date (...) | time(...) | Lat(...) | Lon(...) | 0.8 | 0.8 | in |
| date (...) | time(...) | Lat(...) | Lon(...) | 1.2 | 2 | in |
| date (...) | time(...) | Lat(...) | Lon(...) | 2.2 | 4.2 | in |
| date (...) | time(...) | Lat(...) | Lon(...) | 2.6 | 6.8 | out |
| date (...) | time(...) | Lat(...) | Lon(...) | 2.5 | 9.3 | out |
| date (...) | time(...) | Lat(...) | Lon(...) | 2.7 | 12 | out |

6a: lane departure

Fig. 6b

| date (j) | time(j) | Lat(j) | Lon(j) | e(j) | L(j) | decision(j) |
|---|---|---|---|---|---|---|
| date (j+1) | time(j+1) | Lat(j+1) | Lon(j+1) | -0.5 | 0 | in |
| date (j+2) | time(j+2) | Lat(j+2) | Lon(j+2) | -0.2 | 0 | in |
| date (...) | time(...) | Lat(...) | Lon(...) | 0 | 0 | in |
| date (...) | time(...) | Lat(...) | Lon(...) | 0.1 | 0.1 | in |
| date (...) | time(...) | Lat(...) | Lon(...) | 0.1 | 0.2 | in |
| date (...) | time(...) | Lat(...) | Lon(...) | 0.2 | 0.4 | in |
| date (...) | time(...) | Lat(...) | Lon(...) | 0.2 | 0.6 | in |
| date (...) | time(...) | Lat(...) | Lon(...) | 0.1 | 0.7 | in |
| date (...) | time(...) | Lat(...) | Lon(...) | 0 | 0 | in |

6b minor departure (still in lane)

METHOD OF AUTONOMOUS LANE IDENTIFICATION FOR A MULTILANE VEHICLE ROADWAY

CROSS-REFERENCE TO RELATED APPLICATIONS

This application is a continuation-in-part of co-pending U.S. patent application Ser. No. 14/598,038, filed Jan. 15, 2015, which is herein incorporated by reference.

BACKGROUND

Field

The invention relates to roadway lane management, vehicle segregation by lane-use, charging methods and systems for vehicle tolling, and optimization of the charging performance of electronic tolling for a specific lane of travel.

Description of the Related Art

For managing flow in traffic lanes, sometimes it is useful or desired to toll some traffic lanes, but not all. An example of this is to toll only a single lane on a multi-lane highway. Another example might be to toll several or all of the lanes, but at different rates. A third potential would be to permit the use of a bus lane by a private vehicle subject to a toll. A fourth potential is to segregate, count, or direct vehicles in lanes by vehicle type or other measure.

A well-known example is to convert a special purpose, High Occupancy Vehicle (HOV) lane to a High-Occupancy/Toll (HOT) lane or create a HOT lane into which low-occupancy vehicles are permitted subject to a toll.

A key issue for HOT lanes is the potential expense of a system to detect these users and to charge for use. This is exacerbated by the fact that these systems might toll only one or two lanes out of three or more, and that the lane(s) to be tolled still accommodate(s) the original, previously specified, non-paying vehicles. That means reduced capacity to accommodate tolled vehicles compared to a lane in which every vehicle is being tolled.

A critical concern is expense. How can a road authority or operator admit a controlled number of paying guest users (say single occupant vehicles) into a specific lane, and charge a toll for that use, with the absolute minimum expense. Using systems that require cameras, RFID readers, infrared sensors, or other similar sensing and detection systems requires expensive roadside infrastructure, such as hardened equipment mounted on gantries requiring power and maintenance.

Prior art for identifying specific lane of travel includes RFID "tag and beacon" or the equivalent "transponder and reader". Video systems can be used to identify users within a lane by reading license plates. All of these require roadside infrastructure, and have associated costs that it would be desirable to avoid.

There is also prior art that requires in-vehicle cameras and other techniques such as automated steering monitoring to help in lane guidance. These latter inventions are for keeping a car within a lane rather than identifying which lane the vehicle is in.

What is sought is a method of using in-vehicle telematics for the purpose of lane identification that is effective without roadside equipment and infrastructure. The method sought should have a high degree of accuracy with respect to "charging performance". In other words, the system should make no, or almost no, errors of identification that would cause false charges and very few errors of missed charges. (Error management is described formally in the ISO Technical Standard ISO-17444-1, "Electronic fee collection—Charging performance—Part 1: Metrics".)

Solving the problem of tolling a single lane from a set of lanes means special processing of data from in-vehicle telematics devices but subject to the tests set out in ISO-17444 in order to manage a very low error rate, and in particular a zero or near-zero false-charge rate.

U.S. Pat. No. 7,215,255 details a method and apparatus that comprises appropriate databases, wireless communication, and autonomous metering methods, combined with private, in-vehicle data services to provide a digital, location-based, in-car meter intended to address these kinds of issues. The '255 patent outlines the basis of a system enabled to gather and manage detailed geographic information regarding the use of roadways in an electronic database associated with a location-aware, in-car telemetrics system in order to enable an intelligent, autonomous road-use meter that operates without human intervention. The apparatus described in '255 may be used to advantage in implementation of the present system and method. The '255 patent is incorporated herein by reference.

Prior art to which we also refer includes:

US20140002652 (Gonzales) uses a camera to take images of the road to see what lane the vehicle is in. Beyond GNSS, this solution requires additional equipment, complex processing and sometimes a manual examination and intervention.

US20120215594 (Gravelle) forms a comparison to an "expected travel lane" and to offset lane points. In many circumstances, this solution can be negatively influenced by several GNSS and vehicle-travel error sources, described below under the subject of Lane Drift.

US20120173530 (Kurciska) proposes to detect lane of use by comparing speed patterns. This solution can be a useful adjunct in some circumstances, i.e., when the expected speed differential prevails, which is inconsistent.

US20080300776 (Petrisor) assumes that the presence of a vehicle in a particular managed lane can be detected from GNSS (RNSS in the terminology of this patent) with accuracy. This solution works under ideal circumstances, which do not always prevail, described below under the subject of Lane Drift.

Unfortunately, positioning errors ranging up to a few tens of meters are common in automotive telemetry systems that use wireless radio-signal based positioning systems. Such systems can lead to lane uncertainty resulting in mischarging. It would be desirable to provide a method for optimizing the charging performance of in-vehicle lane identification systems, and thus make available new, lower-cost opportunities for lane-use tolling that arise from improved reliability without the use of roadside infrastructure.

The specific nature of GNSS positioning errors relative to lane of travel applications can be summarized for lane of travel applications as "Lane Drift". Under most circumstances (steady driving, straight or gently curving roadway, and a clear view of a sufficient number of GNSS satellites) we expect GNSS position error to be less than half of a lane width, which would easily provide for correct determination of lane of travel. Prior art recognizes that this is not always the case; hence some inventors add additional processing for speed or cameras for visual checking.

Intentional Lane Drift is defined here as sample points determined to be departing from the expected lane of travel because the vehicle is intending to depart the lane for a different lane, avoiding an obstacle, passing a slower vehicle, or other intentional cause, whether or not such a driving action is permitted by the rules of the road.

Unintentional Lane Drift is defined here as sample points determined to be departing from the expected lane of travel because the vehicle is temporarily departing the lane of travel due to inattention, strong wind, GNSS signal faults due to the subject vehicle creeping slowly under a wide bridge, being surrounded by large vehicles, or other unintentional causes including GNSS signal variation due to multipath error.

Unless the subject vehicle is in fact changing its lane of travel, all lane departure excursions are temporary; these are either significant (more than 1 or 2 meters) for a small number of seconds, or insignificant (less than a meter) for several seconds. It is generally not possible to know whether such temporary excursions are from intentional or unintentional causes. Any such Lane Drift errors that are not filtered out as simple errors (i.e., assessed as a temporary lane departure) can change the assessment of whether the subject vehicle should or should not be considered as in the expected lane of travel.

The present application extends the previous road-use systems, including that described in the '255 patent, in order to identify payable lane-use events (more demanding than identifying road-use events) for automated payment and associated service offerings. This invention specifically includes a method to detect all Lane Drift errors, distinguishing them from actual (planned) lane departures on behalf of the vehicle driver.

SUMMARY

The present method and system are directed at honing the geographic location of a vehicle to enable an in-vehicle, lane-identification system for lane-use management purposes, including charging for lane use. The method and system aim to improve charging performance by addressing certain radio-signal based positioning errors which may occur for any positioning technology such as GNSS, Cell-tower or WiFi or equivalent, particularly within urban environments or other forms of harsh signal terrain that is antithetical to reliable location determination using radio technologies. The method and system presented here will also improve autonomous lane identification on open highways, where "autonomous" means "without the use of roadside equipment or infrastructure".

Broadly speaking, a method is provided for charging a user for using a vehicle within a specific lane of a roadway. Signals are received from one or more signal sources at a receiver within, attached to, or integrated into the vehicle. Using the received signals, an approximate path of travel of the vehicle is identified and it is determined whether the vehicle's approximate path of travel crosses a geofence associated with at least one boundary region of the chargeable roadway facility. If the vehicle's approximate path of travel crosses the geofence, then detailed point-by-point position data is collected and filtered until such time that the vehicle's approximate path exits said geofence. This detailed point-by-point position data can be collected many times per second or once every many seconds. The frequency of collection is circumstance-specific and may be related to speed or may be critical to the efficacy of an instance of the system.

This detailed point-by-point position data is then compared to the detailed centerline data of the target lane as well as to the centerline(s) of each adjacent lane using a distance metric sampled at the same frequency as each sampled travel point or at any sampling or resampling frequency suitable to the level of error in the received telemetry data. Hence the travel record (detailed point-by-point position data), including any positioning errors it may contain, will have a large number of associated proximity measures along a road segment for each of at least two potential lanes of travel—the target or chargeable lane and the lane(s) adjacent to it. (A road segment is a pre-defined length of road, typically between access ramps or intersections.)

Depending on vehicle speed, length of road segment being assessed, and sampling frequency, the number of proximity measures may range from several tens to many hundreds or more. These measures are used to generate a likelihood of travel within each of the lanes compared. These likelihood measures can pertain to a single subset of measured points or to a consecutive series of subsets of any length including the entire road segment length. Thresholds can be set based on prior calibration or on real-time context and a final assessment of whether the vehicle is or was traveling in the targeted lane can be made. Any number of subset assessments can be aggregated and weighted for an entire length of roadway segment, if desired, and a charge or use-fee can be determined from that assessment.

In an alternative implementation, likelihood measures can be assessed for arbitrary portions of the road segment in the event of specialized lanes that are not grade-separated, so that vehicles entering and leaving the target lane(s) in mid road segment can be assessed distinctly from a vehicle that remains within the intended lane throughout the road segment the traveler is using.

According to a first aspect of the invention, a method is provided for identifying whether a vehicle has entered, departed or stayed in a target lane as opposed to an adjacent non-target lane of a segmented roadway, each lane having a width (W), and each lane having a predetermined centerline, which is a series of geographic positions. Signals are received from at least one signal source at a receiver within, attached to or integrated into the vehicle marking the geographic position of the vehicle at a sampling rate in a detailed travel path. At each sampled point in the travel path, the standard perpendicular distance is compared between:

the vehicle and the target lane centerline ($d_1$); and
the vehicle and the non-target lane centerline ($d_2$);

it is assessed that the vehicle is in the target lane if the distance $d_1$ is less than the distance $d_2$, and otherwise, it is assessed that the vehicle is in the non-target lane. From a time ($t_1$) at which the vehicle is assessed to be departing from the target lane, each such sampled point is deemed to be an excursion point and the excursion point departure distances are summed until the vehicle is assessed to return to the target lane, or the detailed travel path ends, at a time ($t_2$). If:

the sum of the excursion point departure distances is less than a threshold distance, or
the time from $t_1$ to $t_2$ is less than a threshold time, it is treated that the vehicle remained in the target lane, and otherwise, it is treated that the vehicle changed to the non-target lane between time $t_1$ and $t_2$.

Preferably, the threshold distance and the threshold time are preset to excuse:

brief excursions of moderate distance; and
lengthier excursions of small distance.

Either the target lane or the non-target lane may be a chargeable lane, in which case the method further comprises making a charging decision based on the treating step.

In some cases, the centerline of the target lane or the non-target lane may be deemed to be at a position other than the absolute centerline of the lane.

The method may further include detecting that the vehicle has crossed an entry geofence or virtual gantry prior to marking the detailed travel path. Or, the frequency of the sampling rate may be increased upon detecting that the vehicle has crossed an entry geofence or virtual gantry.

The method may further include ending marking the detailed travel path upon detection that the vehicle has crossed an exit geofence or virtual gantry. Or, the frequency of the sampling rate may be decreased upon detecting that the vehicle has crossed an exit geofence or virtual gantry.

The threshold time may be expressed as one of: clock time, distance traveled by the vehicle, or number of sampled points.

According to a second aspect of the invention, a system is provided for identifying whether a vehicle has entered, departed or stayed in a target lane as opposed to an adjacent non-target lane of a segmented roadway, each lane having a width (W), and each lane having a predetermined centerline, which is a series of geographic positions. The system includes a receiver within, attached to or integrated into the vehicle for receiving signals from at least one signal source and marking the geographic position of the vehicle at a sampling rate in a detailed travel path. The system also includes circuitry in communication with the receiver programmed for:

at each sampled point in the travel path, comparing the standard perpendicular distance between:
the vehicle and the target lane centerline (d1); and
the vehicle and the non-target lane centerline (d2);
assessing that the vehicle is in the target lane if the distance d1 is less than the distance d2, and otherwise, assessing that the vehicle is in the non-target lane;
from a time (t1) at which the vehicle is assessed to be departing from the target lane, deeming each such sampled point to be an excursion point and summing the excursion point departure distances until the vehicle is assessed to return to the target lane, or the detailed travel path ends, at a time (t2); and
if:
the sum of the excursion point departure distances is less than a threshold distance, or
the time from t1 to t2 is less than a threshold time,
treating the vehicle as having remained in the target lane, and otherwise, treating the vehicle as having changed to the non-target lane between time t1 and t2.

In some embodiments, the receiver and the circuitry are co-located within a device.

In some embodiments, the receiver is part of a wireless device, and the circuitry is in wireless communication with the wireless device.

In some embodiments, the circuitry is further programmed for displaying an indication of the assessed lane. This display may be in the vehicle.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

The invention is described below in detail with reference to the accompanying drawings in which:

FIG. 6a is a table of data supporting the assessed change of lane in FIG. 5a.

DETAILED DESCRIPTION

When using telemetric location methods such as GNSS, cell-tower or WiFi or equivalent, particularly within urban environments or other forms of harsh signal terrain, it is well known that errors of a few or several meters are common. These errors are often mitigated with application-specific equipment or application specific processing for specific contexts.

Figure 4:
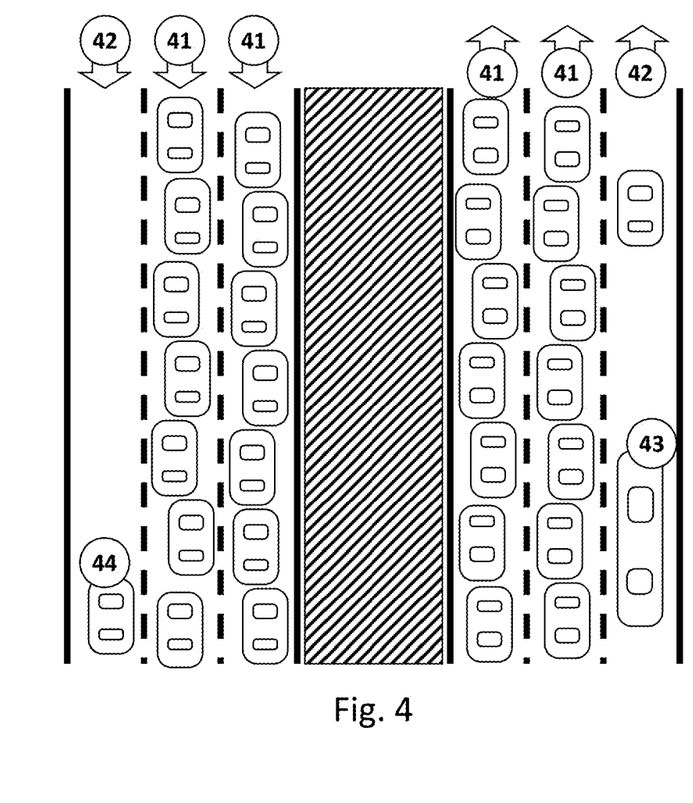
FIG. 4 illustrates the use of differential speed to bolster the likelihood calculation used to determine whether a specific lane was used.

In the case of this invention—lane identification within a multilane vehicle roadway—vehicles may be segregated by type (bus, truck, hazardous goods, car), occupancy (single occupant, multi-occupant), or by usage fee (toll or no toll) or other combination or distinction. FIG. 4 shows an instance of this for free lanes 41 versus high occupancy/toll lanes 42. This invention is useful for high occupancy/toll ("HOT") contexts, but it is not restricted to tolling applications. On the contrary, it can be applied in other traffic, travel and infrastructure management applications that rely on detecting lane of travel.

The present method and system uses autonomous location information gathered by equipment within a vehicle about that vehicle and its travel context within a roadway to determine its lane of travel, often for, but not restricted to, the purpose of tolling said vehicle for the use of that lane. This method and system aim to improve charging performance by addressing location errors which may occur for any positioning technology such as GNSS, cell-tower or WiFi or equivalent, particularly within urban environments or other forms of harsh signal terrain that may generate random and/or transient location errors when using these technologies. The method and system presented here will also improve autonomous lane identification on open highways, where "autonomous" means "without the use of roadside infrastructure".

Figure 1:
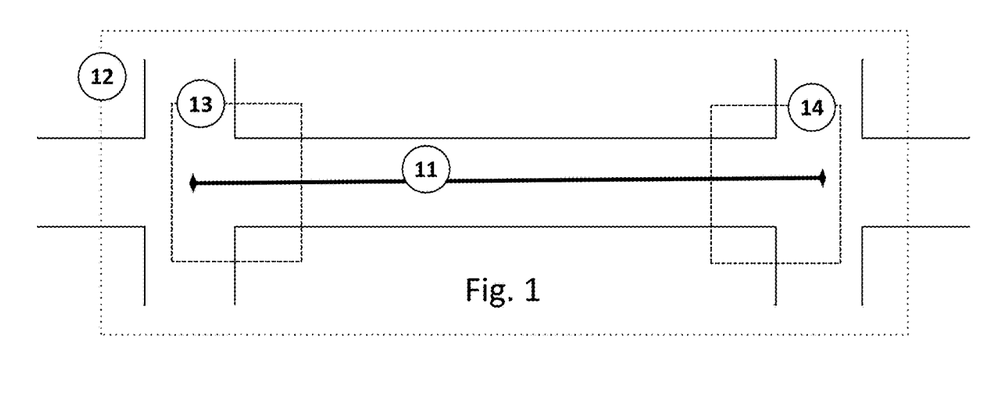
FIG. 1 illustrates an idealized road segment between two intersections or entry/exit ramps. Road segments need not be a straight line and can take on any arbitrary curvature.

The following lane identification method is provided to identify when a vehicle is being used within a specific lane of a roadway. Signals are received from one or more signal sources at a receiver within, attached to, or integrated into the vehicle. Using the received signals, an approximate path of travel of the vehicle is gathered and it is determined whether the vehicle's path of travel crosses a geofence associated with at least one boundary region of the chargeable roadway facility. In FIG. 1 a road segment 11 includes at least two lanes types to be distinguished. This road segment is bounded by an inclusive geofence 12, such that a vehicle must be within this geofence to be considered as a candidate for the lane identification system. This geofence 12 reduces computation. Road segment 11 is marked with virtual gantries at its beginning 13 and end 14 such that when entered or crossed using any geometric calculation including any of the virtual gantry-crossing techniques taught in US 20140236686 A1 (incorporated herein by reference), the subject lane identification algorithm may commence or cease, respectively. The use of virtual gentries 13 14 is for the constrained case of controlled access when a vehicle cannot enter or exit a roadway segment except at the intersection or ramp near these gantries 13 14. Alternatively, for the case of a roadway that maybe entered or exited arbitrarily along its length crossing the geofence 12 is used to begin and end the lane identification algorithm. Geofences and virtual gantries may also be used to set an area where sampling rate is increased. Thus, the geofences or virtual gantries may serve to contain areas where intense processing is required—so that a vehicle need not be assessed continuously (or assessed in detail). For example, parts of a roadway with no distinction between chargeable and non-chargeable lanes (or areas with fewer factors for positioning error) may require no assessment (or less detailed assessment). Most intensive processing can be saved for those areas where fine-distinction is required.

Figure 2:
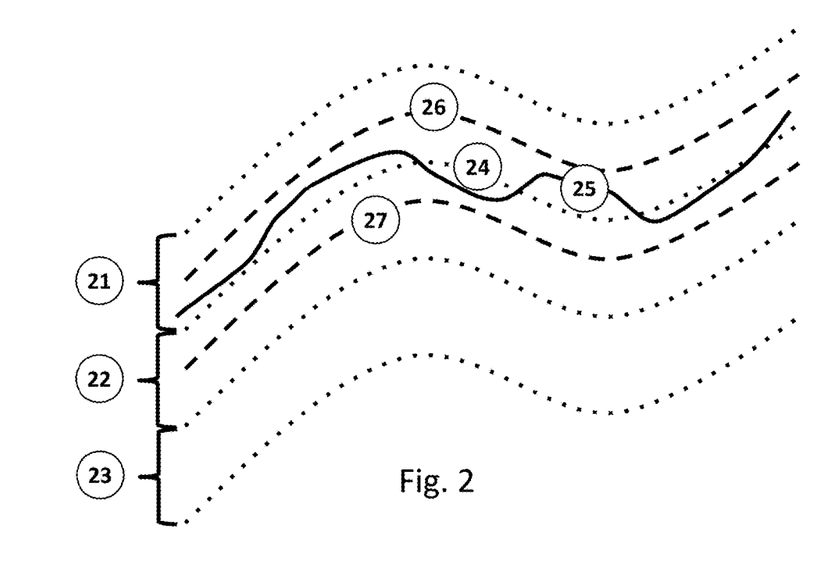
FIG. 2 illustrates an arbitrary close-up section of road segment with multiple lanes, lane boundaries, lane centerlines and a vehicle travel path.

While the lane identification algorithm is operating within the geofence 12 or between the virtual entry 13 and virtual exit 14 gantries, there will be at least one special purpose or "target" lane (toll, bus, high occupancy) and at least one other "general" lane. FIG. 2 is a close up view of a small part of the full road segment 11 and illustrates three lanes of travel proceeding in one direction. One lane 21 is a target lane restricted to specific vehicles, for example, high-occupancy or toll-paying vehicles. Two other lanes 22 23 are general purpose and are not restricted by use. The special purpose or target lane may be separated by an insurmountable barrier, but in the general case addressed here, it may be marked only by a painted or slightly raised line, a painted buffer, or a rumble strip 24. When a subject vehicle uses any of these lanes 21 22 23, that vehicle generates a trip record 25 from its on-board location apparatus. That trip record contains position and speed estimates among other possible elements, multiple times per second or once every few seconds.

Associated with each such roadway lane is an engineering specification or equivalent for the centerline of the lane. In FIG. 2 is shown the centerline 26 for the special lane 21 as well as the centerline 27 for the general lane 22 adjacent to it. These centerline specifications will be invariable and highly accurate relative to the trip record 25. In contrast, the trip record 25 will be slightly different for each trip on this segment since trip records almost always contain at least minor positional variances (inaccuracies).

After the vehicle's approximate path of travel crosses the geofence 12, in the case of a road segment without restricted access or after the approximate path of travel crosses the virtual gantry 13 in the case of a road segment with restricted access, the detailed point-by-point position data of the trip record 25 is collected and filtered by any means useful to remove signal noise until such time that the vehicle's trip record exits the geofence 12 or crosses the virtual exit gantry 14, respectively. This detailed point-by-point position data can be collected many times per second or once every many seconds. The frequency of collection is circumstance-specific and may be related to speed or may be critical to the efficacy of an instance of the system.

Figure 3:
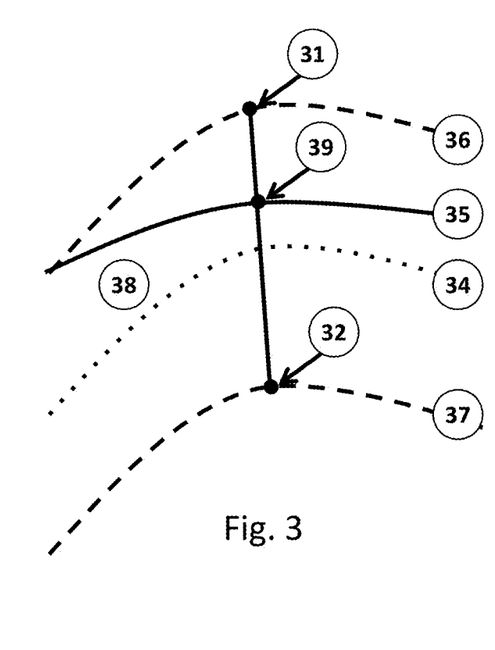
FIG. 3 illustrates the measurement of distance from one sample point to nearby lane centerlines.

Referring to FIG. 3, this further detailed point-by-point position data 35 (same as or derived from the trip record 25) is then compared to the detailed centerline data of the target lane 36 26 as well as, optionally, that of each adjacent lane 37 27 using a distance metric sampled at the same frequency as each sampled travel point or at any sampling or resampling frequency suitable to the level of error in the received data 35. Hence the detailed point-by-point position data 35 25—including any positioning errors it may contain will have a large number of associated proximity measures along the road segment for each of at least two potential lanes of travel—the special purpose lane and the general purpose lane(s) adjacent to it. As an example, the data point 39 in the trip data 35 has a distance to point 31 in centerline 36 (d1) and a distance to a point 32 in centerline 37 (d2). There are well-known ways to measure these distances. To ensure generality, this method can include a point-by-point distance comparison with each centerline of every lane within the road segment. Each of these comparisons will have an associated likelihood to aid in the identification of lane used. Here, at point 39 the vehicle is in the target lane because d1<d2 (or, looked at another way, the vehicle is less than 0.5 W to the centerline of the target lane).

Although it is relatively straightforward (at least in theory) to evaluate an individual point as being in one lane or another, vehicles are frequently seen to make short or longer departures from a lane, affecting charging decisions. This is referred to in the Background as "Lane Drift". In order to address the problem of Lane Drift, a preferred embodiment of this invention:

establishes an excursion time-series, E, such that e(i)=d(i)−0.5 W, where:
    d(i) is the standard perpendicular distance from the centerline at sample (i),
    W is the lane width (considered to be constant for this description), and
    The sampling interval {i, i+1} can be any sampling interval suitable for an application, it may be assumed to be 1 Hz for this description.
    If e(i)<0, the measured position is in the lane, by definition.
In the series E, if e(i)<0, set e(i)=0.
Establish a lane time-series, L, such L(j) is the rolling sum of the prior n e(i) measures.
Specifically, L(j)=Σe(i), i=j−(n−1), j−(n−2), . . . j
for example if n=10, then L(j)=Σe(i), i=j−9, j−8, . . . j
For any L(j)>t, the vehicle is deemed to have left the lane of expected travel
Where t is a threshold set to:
    quickly register a vehicle that has intentionally changed lanes, but
    tolerate a vehicle whose wheels are slightly over the edge-of-lane marking for several seconds.
Examples, using t=15 m, n=20, sample width is 1 Hz:
Vehicle begins to move into an adjacent lane starting at time i, such that e(i)=0.8, e(i+1)=1.9, e(i+2)=2.1 . . . e(i+10)=2.1; L(j)>t at time i+8. Hence, lane exit is determined to be at time i+8.

Vehicle provides two adjacent outliers summing to 16 m, hence the vehicle is determined to be out of the targeted lane for those 2 seconds. But then the vehicle returns (measured by the reverse of this process) and the vehicle is determined to have returned to the targeted lane.

Vehicle runs along the edge of the adjacent lane for many seconds averaging 20 cm in excess of 0.5 W. Only after 75 seconds does the vehicle exceed t, however since n=20, the vehicle is still determined to be in the target lane. Alternatively, if the vehicle measured an average of 1 m over, it would exceed t in less than 15 secs.

Hence this method to address lane drift filters out: [1] long, small-distance excursions; [2] short, modest-distance excursions and [3] very short-lived outliers. Efficacy is achieved through careful setting of threshold, t, and an optimal length for the rolling sum, n. These will be established taking into account posted speed, lane width, and jurisdictional tolerance for imprecise driving.

Figure 5A:
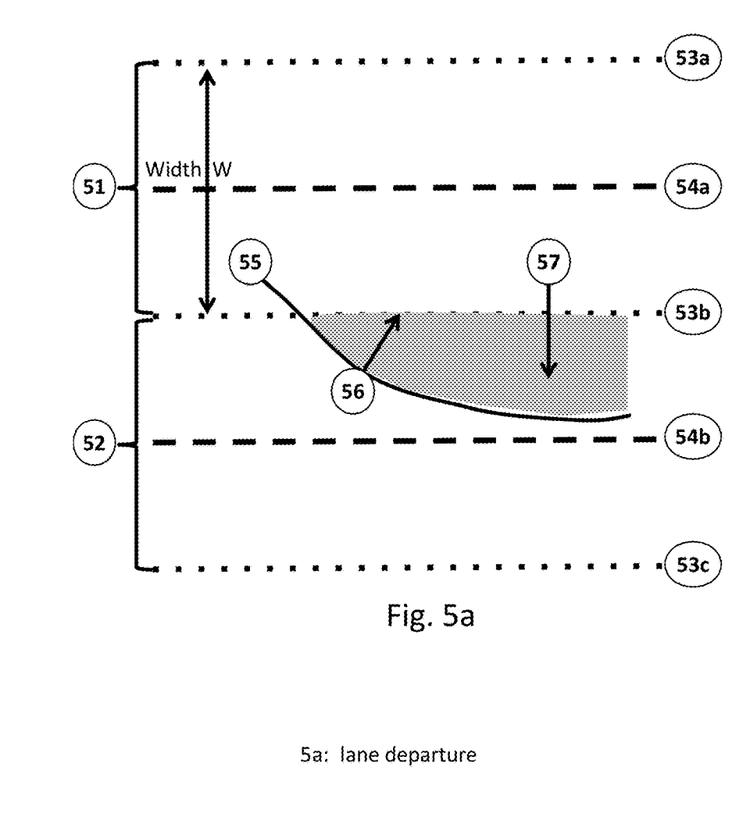
FIG. 5a illustrates an example of a lane departure assessed as a change of lane.
Figure 6A:
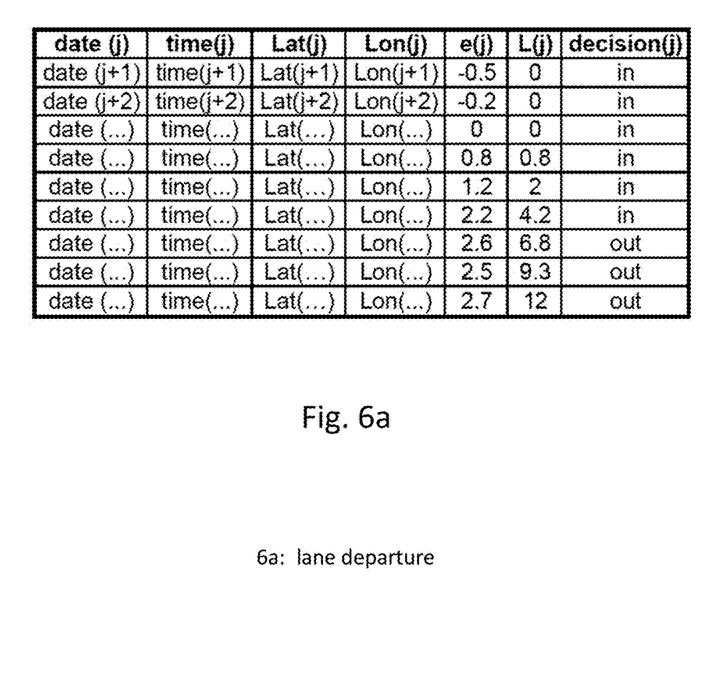

FIG. 5a illustrates an application of the method with sample data from FIG. 6a. The vehicle begins in target lane 51. Lane 51 has bounds 53a 53b. Lane 52 has bounds 53b 53c. The respective centerlines are denoted 54a 54b. At each point in the path 55, an assessment is done (like that shown in FIG. 3) comparing the position to centerlines of lane 51 and lane 52. Departure distances are summed as well as time spent outside the initial lane (t1 to t2 or length of rolling sum n). Here, the departure 57 represents an actual lane change (decision "out" in FIG. 6a).

Figure 5B:
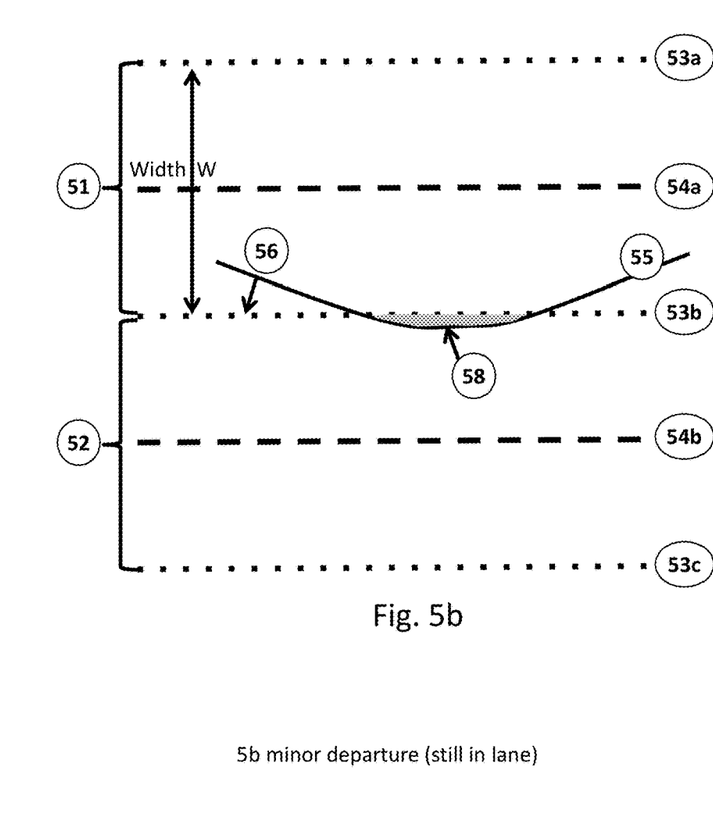
FIG. 5b illustrates an example of a (minor) lane departure not assessed as a change of lane.
Figure 6B:
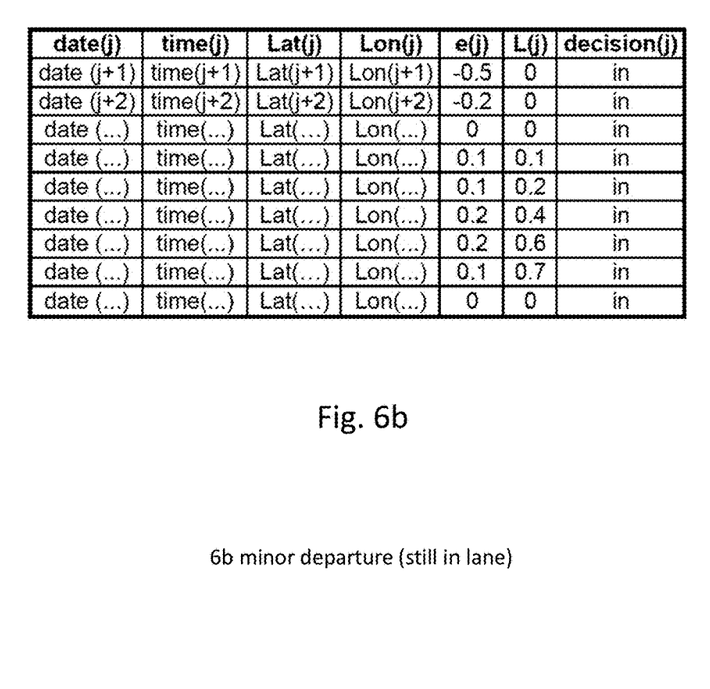
FIG. 6b is a table of data supporting the non-assessment of a lane change in FIG. 5b.

FIG. 5b illustrates an application of the method with sample data from FIG. 6b. The vehicle begins in target lane 51. Although there is a minor departure 58 from lane 51, the vehicle is assessed as remaining continuously in lane 51 for the purpose of charging as the departure did not exceed time or distance thresholds unlike in FIG. 5a.

Depending on vehicle speed, length of road segment being assessed, and sampling frequency, the number of proximity measures may range from several tens to many hundreds. These measures are used to generate a likelihood of travel within each lanes compared. These likelihood measures can pertain to single sample points, to subsets of several samples points each, as a weighted sum for the entire length of road segment, or as a combination of these approaches. Many small assessments can be aggregated and weighted for an entire length of roadway segment. Likelihood thresholds can be set based on prior calibration or on real-time context and used to make a final assessment of whether the vehicle was traveling in a special lane or a general lane and a charge. A charge, toll, user-fee or other management decision can be determined from that assessment.

In an alternative implementation, likelihood measures can be assessed for arbitrary portions of the road segment in the case of no barrier separating the special lane(s) so that vehicles entering and leaving the special lane(s) mid road-segment can be assessed distinctly from a vehicle that remains within the intended lane throughout the road segment being measured.

As a further aid to assessing the likelihood of travel in a special lane or a general-purpose lane it is possible to employ speed information. In the case of congestion management schemes such as high occupancy/toll lanes FIG. 4, during the time of scheduled tolling it is typical and expected that the special purpose lanes 42 will be traveling somewhat faster than the general-purpose lanes 41. Speed information for the subject vehicle 44 is available from its trip record, while speed information about the vehicles in the general-purpose lanes 41 is available from a number of services that capture this information wirelessly using cellular data and other techniques, including even historical daily speed patterns. Such a speed differential may be used to promote, diminish or confirm the computed likelihood measure. Such speed comparisons are often critical anyway to insure lane performance for the special-purpose lanes.

The geofence may be one of:

a virtual gantry or a set of virtual gantries predetermined to capture the vehicle's passage or entry to the road segment containing the targeted, specific lane to be identified, and crossing that geofence triggers the process of specific lane identification. This is for the case of a limited access road segment that can only be entered at a specific intersection(s) or ramp(s).

a virtual gantry surrounding the entire road segment for the same purpose, but allowing entry at any point along the segment. This is for the case of a general road segment that might be entered at any arbitrary location along its length.

Where virtual gantries are used, the step of determining if the vehicle's approximate path of travel crosses a geofence may comprise the direction of crossing the virtual gantry.

Where bounding polygons are used as virtual gantries, the bounding polygon may be approximated with a bounding rectangle.

In one embodiment, the signal source is a satellite positioning receiver/transmitter. The receiver/transmitter may be a portable device or a device fixed in the vehicle.

In certain embodiments, the signal source (or at least part of its functionality) may be provided by a user's mobile device.

In certain embodiments, the signal source (or at least part of its functionality) may be provided by an in-dash positioning system.

In one embodiment, the signal source has receiving and transmitting components in separate physical devices that are in communication with each other.

In certain embodiments, the lane of travel may be at the edge of a roadway and have an adjacent shoulder. In this case, the centerline may be intentionally biased toward the shoulder and the lane width adjusted to reduce the probability of detecting an unintentional lane drift error.

While the foregoing is directed to embodiments of the present disclosure, other and further embodiments of the disclosure may be devised without departing from the basic scope thereof, and the scope thereof is determined by the claims that follow.

The invention claimed is:

1. A method of identifying whether a vehicle has entered, departed or stayed in a target lane as opposed to an adjacent non-target lane of a segmented roadway, each lane having a width, and each lane having a predetermined centerline, which is a series of geographic positions, the method comprising:

receiving signals from at least one signal source at a receiver within, attached to or integrated into the vehicle marking the geographic position of the vehicle at a sampling rate in a detailed travel path;

at each sampled point in the travel path, comparing a standard perpendicular distance between:
the vehicle and the target lane centerline (d1); and
the vehicle and the non-target lane centerline (d2);

assessing that the vehicle is in the target lane if the distance d1 is less than the distance d2, and otherwise, if the distance d2 is less than the distance d1, assessing that the vehicle is in the non-target lane; and from a time (t1) at which the vehicle is assessed to be departing from the target lane toward the non-target lane;
establishing an excursion time-series such that each element in the excursion time-series, sampled at successively equally spaced points in time, is the standard perpendicular distance from the centerline of the target lane minus half of the lane width;

deeming each such element to represent an excursion point departure distance;

calculating the sum of the excursion point departure distances until the vehicle is assessed to return to the target lane, or the detailed travel path ends, at a time (t2);

wherein:

treating the vehicle as having remained in the target lane if the sum of the excursion point departure distances is less than a threshold distance, or the time from t1 to t2 is less than a threshold time, and otherwise, treating the vehicle as having changed to the non-target lane between time t1 and t2.

2. The method of claim 1, wherein the threshold distance and the threshold time are preset to excuse:

brief excursions of moderate distance; and lengthier excursions of small distance.

3. The method of claim 1, wherein either the target lane or the non-target lane is a chargeable lane, and wherein the method further comprises making a charging decision based on the treating step.

4. The method of claim 1, wherein the centerline of the target lane or the non-target lane is deemed to be at a position other than the absolute centerline of the lane.

5. The method of claim 1, further comprising detecting that the vehicle has crossed an entry geofence or virtual gantry prior to marking the detailed travel path.

6. The method of claim 1, further comprising upon detecting that the vehicle has crossed an entry geofence or virtual gantry, increasing a frequency of the sampling rate.

7. The method of claim 5, further comprising ending marking the detailed travel path upon detection that the vehicle has crossed an exit geofence or virtual gantry.

8. The method of claim 6, further comprising decreasing the frequency of the sampling rate upon detecting that the vehicle has crossed an exit geofence or virtual gantry.

9. The method of claim 1, wherein the threshold time is expressed as one of: clock time, distance travelled by the vehicle, or number of sampled points.

10. A system for identifying whether a vehicle has entered, departed or stayed in a target lane as opposed to an adjacent non-target lane of a segmented roadway, each lane having a width, and each lane having a predetermined centerline, which is a series of geographic positions, the system comprising:

a receiver within, attached to or integrated into the vehicle for receiving signals from at least one signal source and marking the geographic position of the vehicle at a sampling rate in a detailed travel path;

circuitry in communication with the receiver programmed for:

at each sampled point in the travel path, comparing a standard perpendicular distance between:

the vehicle and the target lane centerline (d1); and the vehicle and the non-target lane centerline (d2);

assessing that the vehicle is in the target lane if the distance d1 is less than the distance d2, and otherwise, if the distance d2 is less than the distance d1, assessing that the vehicle is in the non-target lane; and from a time (t1) at which the vehicle is assessed to be departing from the target lane toward the non-target lane:

establishing an excursion time-series such that each element in the excursion time-series, sampled at successively equally spaced points in time, is the standard perpendicular distance from the centerline of the target lane minus half of the lane width;

deeming each such element to represent an excursion point departure distance;

setting any excursion point departure distance in the excursion time-series less than zero equal to zero; and calculating the sum of the excursion point departure distances until the vehicle is assessed to return to the target lane, or the detailed travel path ends, at a time (t2);

wherein:

treating the vehicle as having remained in the target lane if the sum of the excursion point departure distances is less than a threshold distance, or the time from t1 to t2 is less than a threshold time, and otherwise, treating the vehicle as having changed to the non-target lane between time t1 and t2.

11. The system of claim 10, wherein the receiver and the circuitry are co-located within a device.

12. The system of claim 10, wherein the receiver is part of a wireless device, and the circuitry is in wireless communication with the wireless device.

13. The system of claim 10, wherein the circuitry is further programmed for displaying an indication of the assessed lane.

14. The system of claim 13, wherein the display is in the vehicle.

* * * * *